United States Patent [19]

Takeuchi et al.

[11] 4,381,405

[45] Apr. 26, 1983

[54] PROCESS FOR THE PREPARATION OF POLYMETHYLENE POLYPHENYL POLYISOCYANATE COMPOSITION

[75] Inventors: Koichi Takeuchi; Katsuharu Miyata, both of Yokohama, Japan

[73] Assignee: Mitsui Toatsu Chemicals, Incorporated, Tokyo, Japan

[21] Appl. No.: 212,022

[22] Filed: Dec. 1, 1980

[30] Foreign Application Priority Data

Dec. 5, 1979 [JP] Japan ............................ 54-156919

[51] Int. Cl.$^3$ ................ C07C 125/06; C07C 69/00; C08G 18/76
[52] U.S. Cl. ............................ 560/25; 252/182; 260/453 P; 528/67
[58] Field of Search ............. 560/25; 528/45, 67; 521/160; 260/453 P; 252/182

[56] References Cited

U.S. PATENT DOCUMENTS 3,476,933 11/1969 Mendelsohn .................. 260/2.5
4,162,362 7/1979 Shawl .............................. 560/25

Primary Examiner—H. S. Cockeram
Attorney, Agent, or Firm—Fisher, Christen & Sabol

[57] ABSTRACT

A polymethylene polyphenyl polyisocyanate composition comprising polymethylene polyphenyl polyisocyanates, a part of the isocyanate groups contained therein being substituted by a carbamate group, or said polymethylene polyphenyl polyisocyanates having the substituted carbamate group and polymethylene polyphenyl polyisocyanate not having carbamate group. The total amount of the carbamate groups contained in the composition is up to 10 percent by mole based on the total amount of isocyanate groups contained in the composition. The composition is useful for the preparation of rigid polyurethane which has many industrial applications. A process for the preparation of the composition is also disclosed.

6 Claims, No Drawings

PROCESS FOR THE PREPARATION OF POLYMETHYLENE POLYPHENYL POLYISOCYANATE COMPOSITION

BACKGROUND OF THE INVENTION (a) Field of the Invention

This invention relates to an improved polyisocyanate composition and a process for the preparation thereof. More particularly it relates to a polymethylene polyphenyl polyisocyanate composition containing up to 10 percent by mole of an alkoxycarbonylamino group (hereinafter referred to as a carbamate group) based on an isocyanate group in the composition, and to a process for the preparation thereof.

(b) Description of the Prior Art

A methylene crosslinked polyphenyl isocyanate reacts with polyfunctional hydrogen compounds, such as polyesters, polyester amides and polyethers, to form rigid polyurethane substances. Such reaction can be conducted in the presence of a blowing agent to obtain a foam product. The polyurethane foam thus obtained is generally called a rigid foam and has a closed-cell structure with excellent heat insulating properties, heat resistance, weatherability and chemical resistance. The foam has various uses, for example, heat insulating materials for use in a refrigerator, a house and the like, lagging materials for use in oil tanks, chemical plants and etc., and the like. Recently, however, there has been an increased demand for the weight saving of the foam for the saving of energy and resources it provides.

However, a reduction of the foam density to obtain the weight saving of the rigid polyurethane foam causes a lowering of the compressive strength, degree of closed-cell and dimensional stability. The reduction of the density can readily be obtained by increasing the amount of the blowing agent, but it causes a lowering of the compressive strength. Accordingly attempts have been made to increase the compressive strength by use of sugar base polyethers or sugar amine base polyethers as the polyol; but the dimensional stability at lower temperatures is decreased to a level which is unsatisfactory for use in refrigerators and the like due to the above-stated drawback. Further, an improvement has been proposed whereby a catalyst is selected to regulate the polymerization rate and expansion rate, but unsatisfactory results are obtained.

SUMMARY OF THE INVENTION

An object of this invention is to provide a polyisocyanate composition which is useful for the preparation of a low density rigid polyurethane foam having a high compressive strength, an excellent dimensional stability at lower temperatures and a high degree of closed-cell, and to provide a process for the preparation thereof.

The polyisocyanate composition of the present invention comprises polymethylene polyphenyl polyisocyanates, which have at least a part of the isocyanate groups thereof substituted by carbamate groups. Also included are mixtures of such carbamate-substituted polymethylene polyphenyl polyisocyanates with polymethylene polyphenyl polyisocyanates which do not have any carbonate groups. The amount of the carbamate group in the composition is up to 10 percent by mole based on the amount of the isocyanate group in the composition.

DETAILED DESCRIPTION OF THE INVENTION

The polyisocyanate composition of the present invention is further defined as being a polymethylene polyphenyl polyisocyanate composition that contains up to 10 percent by mole of the —NCO group contained in the polymethylene polyphenyl polyisocyanates represented by the general formula (I);

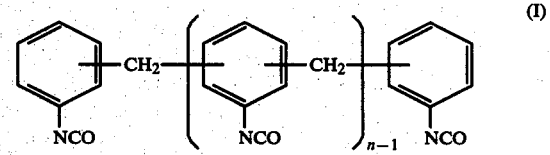

wherein n is an integer of one or more, preferably from 1 to 6, which is substituted by a carbamate group represented by the formula —NHCO$_2$R wherein R is a lower alkyl group having 1 to 4 carbon atoms.

The ratio of the NHCO$_2$R group to the NCO group is not always defined with respect to an individual compound in the mixture and may be defined as a ratio in the mixture as a whole.

The total amount of carbamate groups contained in the aforesaid composition is up to 10 percent by mole based on the total amount of isocyanate groups; the lower limit thereof being preferably 0.1 percent by mole. An especially preferred carbamate group content is in the range of 0.5 to 8 percent by mole based on the isocyanate group.

The aforesaid composition is prepared by a process in which two or more polymethylene polyphenyl polyisocyanates, at least a part of the isocyanate groups thereof substituted by the carbamate group, are mixed or wherein such carbamate-substituted polymethylene polyphenyl polyisocyanates are mixed with polymethylene polyphenyl polyisocyanate which do not have any carbamate group in an appropriate proportion such that the carbamate group content in the composition thus obtained is up to 10 percent by mole based on the isocyanate group. Also the aforesaid composition can be prepared by a process in which polymethylene polyphenyl polycarbamates represented by the general formula (II):

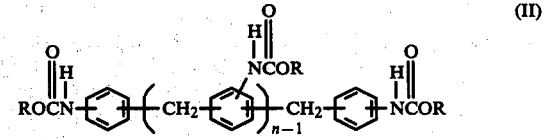

wherein R represents a lower alkyl group having 1 to 4 carbon atoms and n represents an integer of one or more, preferably from 1 to 6, are thermally decomposed under specified conditions.

According to the preferred process for the preparation of the polymethylene polyphenyl polyisocyanate composition, one starts with a mixture of polymethylene polyphenyl polycarbamic acid esters, which are obtained by the condensation reaction of N-phenyl carbamic acid alkyl ester represented by the general formula (III):

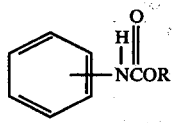 (III)

wherein R represents an alkyl group having 1 to 4 carbon atoms, with formaldehyde or a formaldehyde-producing compound, and which are are represented by the general formula (II). Such polymethylene polyphenyl polycarbamic acid esters are thermally decomposed under such specifical conditions that some of the carbamate groups partly remain unchanged in order to obtain the polymethylene polyphenyl polyisocyanate composition. According to the above-mentioned process, N-phenyl carbamic acid ester and formaldehyde or a formaldehyde-producing compound are subjected to condensation reaction in the presence of an acid catalyst.

Examples of the N-phenyl carbamic acid esters include:
N-phenyl carbamic acid methyl ester, N-phenyl carbamic acid ehtyl ester,
N-phenyl carbamic acid n-propyl ester,
N-phenyl carbamic acid isopropyl ester,
N-phenyl carbamic acid n-butyl ester,
N-phenyl carbamic acid sec-butyl ester,
N-phenyl carbamic acid iso-butyl ester,
N-phenyl carbamic acid tert-butyl ester, and the like.

In addition to formaldehyde, formaldehyde-producing compounds such as paraformaldehyde, trioxane, methylal and other formal compounds may be used instead thereof. The amount of formaldehyde or formaldehyde-producing compounds is in the range of 0.1 to 10 moles, preferably 0.2 to 2.0 moles, thereof as formaldehyde per mole of N-phenyl carbamic acid ester as a raw material.

Examples of the acid used in the process of the present invention include a mineral acid, such as hydrochloric acid, fulfuric acid, phosphoric acid and boric acid, and an organic acid, such as formic acid, acetic acid, oxalic acid and toluenesulfonic acid. The so-called super acids such as hydrobromic acid, perchloric acid, chlorosulfonic acid, methanesulfonic acid and trifluoromethanesulfonic acid are also effective.

Examples of other effective acids include ion exchange resins containing an acid group, such as a carboxyl group and a sulfonic acid group, and an acid which is called a Lewis acid, such as boron trifluoride, iron chloride, aluminium chloride, zinc chloride and titanium chloride.

In the case of a protonic acid such as the above-mentioned mineral acid, organic acid or super acid, the amount of the acid used is in the range of 0.001 to 10 moles, preferably 0.01 to 4 moles thereof per mole of N-phenyl carbamic acid ester as the raw material. In the case where these acids are used as an aqueous solution, the acids are desirably used in a concentration of 10 to 95 percent by weight, preferably 20 to 80 percent by weight thereof based on the amount of water in the reaction system. If the concentration is less than 10 percent by weight, the reaction rate becomes so low that the aforesaid process is substantially unavailable as an industrial process. If the concentration is higher than 95 percent by weight, an unfavorable side reaction such as hydrolysis of the raw material takes place.

The condensation reaction is carried out by heating with an acid catalyst in the absence of a solvent or in the presence of a suitable solvent. Examples of the suitable solvent include: aliphatic hydrocarbons, such as hexane and heptane; alicyclic hydrocarbons, such as cyclopentane, cyclohexane and methylcyclohexane; aromatic hydrocarbons, such as benzene, toluene and xylene; alkyl-, halogen-, and nitrosubstituted compounds thereof; halogenated hydrocarbons, such as chloroform, methylene dichloride, carbon tetrachloride, dichloroethane, trichloroethane and tetrachloroethane; fatty acid alkyl esters, such as ethyl acetate; ethers, such as diethyl ether, di-isopropyl ether, dioxane and tetrahydrofuran; and the like. The amount of solvents used is in a ratio by weight of 0.1 to 100, preferably 0.2 to 50 there of to the amount of N-phenyl carbamic acid ester as a raw material.

The reaction temperature is generally in the range of from 10° to 150° C., preferably 20° to 120° C. At higher temperatures unfavorable side reactions such as hydrolysis take place. The reaction time is varied depending on reaction procedures and reaction conditions, but it is usually in the range of one minute to 10 hours.

Polycarbamic acid esters thus obtained are composed of binuclear compounds, trinuclear compounds and higher polynuclear compounds. The ratio thereof in the composition can be varied by means of the molar ratio of N-phenyl carbamic acid ester to formaldehyde, the kind of catalyst, and the other reaction conditions.

The ratio in the composition among these polynuclear compounds obtained from the polycarbamic acid esters approximately corresponds to that obtained from the polyisocyanates obtained by thermal decomposition, so that it is favorable to select a ratio of these polynuclear compounds in the composition such that the isocyanate content and viscosity are not greatly affected by the amount of any compound having an alkoxycarbonylamino group remaining in the final product and such that an excellent foam is formed. Thus, a dicarbamate content in polycarbamic acid esters is in the range of from 40 to 80 percent by weight, preferably 50 to 70 percent by weight.

The reaction product obtained by condensation reaction is subjected to thermal decomposition reaction after the removal of the catalyst and solvent.

The thermal decomposition of the polycarbamic acid esters can be effected either by a process in which the reaction is carried out at high temperatures for a short period of time or by a process in which the reaction is carried out by use of an inert solvent at relatively lower temperatures. In both such processes compounds having an alkoxycarbonyl group may be contained therein.

The thermal decomposition reaction is normally carried out in an organic solvent. The organic solvent used is an inert solvent that can dissolve polycarbamic acid ethers and polyisocyanates at room temperature, or at least at the reaction temperature. However, a solvent that has too high of a boiling point is unfavorable in that removal of the solvent is difficult and causes retrogradation of the isocyanate group and pollution of the polyisocyanate product with a resulting reduction in its commercial value. The solvent is preferably removed by distillation after completion of the thermal decomposition reaction, so the solvent preferably has a boiling point up to 300° C. under atmospheric pressure. If an inert solvent has a boiling point higher than 300° C., the inert solvent should preferably be a solvent that can form an azeotropic point up to 300° C. under atmospheric pressure with another solvent as a third component. The solvent used as the third component may also be an inert solvent having a boiling point up to 300° C. in order to lower the boiling point of the inert solvent.

Straight-chain or branched-chain aliphatic hydrocarbons or lower alkyl benzenes are unfavorable as solvents because the solubility of the raw materials therein is poor. Examples of preferable inert solvents include: aromatic hydrocarbons, such as substituted benzenes and substituted naphthalenes, for example, nitro or halogen compounds, which are unreactive with isocyanate, and which include chlorobenzene, nitrobenzene, chloronaphthalene and the like; diphenyls, diphenyl methanes, and terphenyls; aromatic ethers, such as diphenyl ether and diphenyl thioether; esters, such as dibutyl phthalate and dioctyl phthalate; and the like. The concentration of the raw material in the solvent is in the range of 1 to 30 percent by weight, preferably 5 to 20 percent by weight in order to suppress side reactions such as a reaction between isocyanates thus formed, a reaction of isocyanates with the raw material, and the like.

The thermal decomposition reaction may be carried out in the absence of a catalyst, but it is usually carried out in the presence of a trace amount of a catalyst. Preferable catalysts used in the process of the present invention include zinc, aluminium and compounds thereof. Such catalysts are used as metallic compounds which are readily soluble in the inert solvent used in the thermal decomposition reaction, and which for example, are halides of zinc and aluminium, salts of organic carboxylic acid, a complex thereof with an organic ligand such as acetyl acetone, and the like. Preferable examples of these catalysts include zinc chloride, aluminium chloride, zinc acetate, zinc naphthenate, zinc acetyl acetone and the like.

The amount of catalyst used is in the range of 5 to 100 ppm, preferably 40 to 90 ppm, as metal based on the raw material. A higher catalyst content causes retrogradation of isocyanate group.

The reaction temperature for the thermal decomposition reaction is preferably in the range of 200° to 350° C. At a temperature lower than 200° C. the thermal decomposition rate becomes so low that allphanate linkages are increased, and at 350° C. or higher an increase of polymers due to side reactions are developed.

The reaction pressure is determined by the kind of solvent used, but it is up to 10 kg/cm$^2$G and preferably atmospheric pressure or lower is used.

In the preparation of the composition of the present invention, the thermal decomposition reaction must be stopped halfway so that the alkoxycarbonylamino group of polycarbamic acid esters may remain in an amount of 10 percent per mole based on the isocyanate group. This control of the reaction can be attained by catching the amount of alcohol distilled off, or by determining a relationship between the degree of conversion of methylene bis (phenyl carbamate) (MDC), the rate of change of methylene monocarbamate monoisocyanate (MIC) or the rate of formation of methylene bis (phenyl isocyanate) (MDI) and the reaction time for stopping the reaction aiming at the halfway point of the reaction, or by determining the residence time for a continuous process. The reaction time is varied depending on the amount of insert solvent distilled out of the reaction system, the kind and amount of the catalyst used, and the like, along with the reaction temperature and reaction pressure. The reaction temperature normally ranges from 30 minutes to 6 hours. After completion of the decomposition reaction, the solvent is removed to obtain the polyisocyanates. Removal of the solvent is preferably effected immediately after completion of the thermal decomposition. The temperature for distilling off the solvent is preferably as low as possible. At higher temperatures, the retrogradation of the polyisocyanates thus formed, especially binuclear compounds, takes place to a remarkable degree. In the industrial process, the removal of the solvent can readily be effected by a flashing procedure-the solvent can be distilled off at higher temperatures in a shorter period of time than is needed to completely distill off the solvent.

The thermal decomposition reaction in the process of the present invention may be effect by any method so long as the respective reaction conditions are satisfied. However, the simplest and most economical method is a method where the reaction is effected in a reactor fitted with a reflux tower while refluxing the inert solvent to remove alcohol.

The novel polyisocyanate composition thus obtained by the present invention is mainly composed of a methylene crosslinked polyphenyl isocyanate mixture represented by the general formula (I) and compounds having a carbamate group, or compounds having a so-called urethane type structure are contained therein. Examples of the compounds having a carbamate group include: methylene monocarbamate monoisocyanate, 2,4-bis(p-carbamate benzyl)phenyl isocyanate, 2,4-bis(p-isocyanate benzyl)phenyl carbamate, 2-(p-isocyanate benzyl)-4-(p-carbamate benzyl)phenyl isocyanate, 2-(p-carbamate benzyl)-4-(p-isocyanate benzyl)phenyl isocyanate, 2-(p-isocyanate benzyl)-2-(p-carbamate benzyl)phenyl carbamate, 2-(p-carbamate benzyl)-4-(p-isocyanate benzyl)phenyl carbamate; and the like; and further include such compounds as precursors of polyvalent polyisocyanates having partly remaining carbamate groups.

That is, the composition of the present invention contains binuclear compounds, in the case where n=1 in the general formula (I), in an amount of from 30 to 80 percent by weight, along with isocyanate compounds which partly have the carbamate group. The isocyanate compounds having the carbamate groups in the composition are contained therein in such an amount that the carbamate groups are present up to 10 percent by mole based on the isocyanate groups. The composition may contain a small amount of biuret, isocyanate dimer, isocyanurate and compounds having a urea type structure. Generally a decrease in the isocyanate group content in polyisocyanates has a tendency to increase the viscosity. In the preparation of rigid urethane foam by mixing polyol therewith, a low isocyanate content causes an increase in the amount of polyisocyanate need so uneconomical, and a higher viscosity causes a poor mixed state with polyol and other materials such as foam stabilizer, blowing agent and catalyst, so that a favorable foam is not obtained.

However, according to the polyisocyanate composition of the present invention, which includes polyisocyanates which partly contain carbamate groups, a decrease in isocyanate group content does not cause any decrease in viscosity because carbamate groups remain. The rigid urethane foam prepared by use of the composition of the present invention has excellent properties especially at a low density, and is a high quality froam having characteristics which are not possessed by the conventional methylene crosslinked polyphenyl polyisocyanates.

That is, the rigid urethane foam prepared by use of the present invention invariably has a higher compressive strength as compared with rigid urethane foam having an identical density and prepared by use of the conventional polyisocyanate composition. The degree of closed-cells of the urethane foam prepared by use of the conventional polyisocyanate composition is abruptly lowered at lower densities, but of the urethane foam prepared by use of the isocyanate composition of the present invention is kept at an approximately constant level without any abrupt lowering thereof. With respect to dimensional stability at low temperatures, it is impossible to obtain good dimensional stability for a urethane foam having a density lower than 28 kg/m³ and prepared by use of the conventional isocyanate composition because marked shrinkage occurs. The use of the polyisocyanate composition of the present invention makes it possible to obtain a low density foam having a density as low as 25 kg/m³, which shows that a weight saving by nearly 10 percent has been made. A decrease of isocyanate group content due to conversion of isocyanate group to carbamate group results in no change in the density and in a good foaming efficiency.

A polymethylene polyphenyl polyisocyanate composition obtained according to the process of the present invention is a brown liquid at room temperature, has an isocyanate content of 25 to 32 percent by weight and has a viscosity of up to 500 cp (25° C.).

The present invention is illustrated in detail by the following examples, wherein unless otherwise indicated, the percentages are by weight. Physical and chemical properties of isocyanate and foam are measured according to the following methods:

| | |
|---|---|
| Isocyanate content | ASTM D 1638 - 61T |
| Density | ASTM D 1622 - 63 |
| Compressive strength | ASTM D 1621 |
| Degree of closed-cell | Air Comparison Type Gravimeter (corresponding to ASTM D 2856) |
| Dimensional stability | ASTM D 2342 |
| | ASTM D 2126 |

Measurement of the methylene diphenyl monocarbamate monoisocyanate content is carried out by high speed liquid chromatography, and the ratio

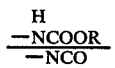

of carbamate group

to isocyanate group —NCO is determined by infrared absorption spectrum.

The raw materials used for the preparation of rigid foam are shown below:

| | |
|---|---|
| Polyol | Sugar amine-based polyether having a hydroxyl value of about 470 and a viscosity of 1800 cp at 25° C. ("PPG-NT-470" of Mitsui Nisso Corporation) |
| Blowing Agent (A) | Water |
| Blowing Agent (B) | Trichlorofluoromethane |
| Foam stabilizer | ("F-11A" of Mitsui Fluoro Chemicals, INC.) Polyalkylene siloxane ("Silicone F-341" of Shin-Etsu Chemical Co. Ltd.) |
| Catalyst | Tetramethylene hexamethylenediamine (referred to as TMHMD) |

EXAMPLE 1

To a 6 l flask, 1000 g of N-phenyl ethyl carbamate, 90 g of paraformaldehyde, 420 g of boron trifluoride ethylate [BF$_2$(C$_2$H$_5$)O] as a catalyst and 3000 cc of benzene as a solvent are charged, and the resultant mixture is subjected to condensation reaction with agitation in a nitrogen stream. The reaction temperature is 80° C., and the reaction time is 5 hours. After completion of the condensation reaction, the resultant reaction mixture is washed with water to remove the catalyst, benzene is distilled off with a rotary evaporator, and unreacted N-phenyl ethyl carbamate is almost completely removed by distillation under reduced pressure. The composition of polycarbamic acid ethyl esters thus obtained is as follows:

| | Content (%) |
|---|---|
| Unreacted N—phenyl carbamate | 5.0 |
| Binuclear compounds (MDC) | 50.8 |
| Trinuclear compounds | 24.7 |
| Other higher polycarbamates | 19.5 |

To a 6 l of flask fitted with a reflux condenser 200 g of the condensation product obtained as above, 4000 g of, diphenyl ether as an inert organic solvent and 16 mg of zinc chloride as a catalyst are charged, and the resultant mixture is subjected to thermal decomposition at a reaction temperature of 253° C. Heating by use of a mantle heater, the reaction is carried out in such a manner that the inert organic solvent is invariably kept at its boiling state with regulation of the pressure in the range of from 700 to 720 mmHg. The alcohol thus formed is discharged as vapor at the top of the condenser along with a part of the solvent. The reaction is stopped 60 minutes after the temperature of the reaction mixture reaches the reaction temperature of 253° C. and boiling thereof starts, and then removal of solvent is effected. For the complete removal of the solvent, the mixture is transferred to a distilling flask to remove the solvent at 140° C. under a reduced pressure of 1 mmHg. The composition of novel polyisocyanates thus obtained is shown below. Unreacted N-phenyl carbamate is recovered from alcohol distillate in an yield of 98 percent. It is considered that N-phenyl isocyanate discharged is recombined with alcohol.

| | Content (%) |
|---|---|
| Binuclear compound | 42.3 |
| MIC (binuclear compound containing alkoxycarbonyl group) | 8.2 |
| Trinuclear compound | 23.0 |
| Trinuclear compound containing alkoxycarbonyl group | 0.4 |
| Other higher isocyanates | 26.1 |

The isocyanate content therein is 26.8 percent. The polyisocyanate composition thus obtained is mixed with polyol using of the following composition:

|  | (g) |
| --- | --- |
| Polyol | 100 |
| Blowing Agent (A) | 1.0 |
| Blowing agent (B) | 45.7 |
| Foam stabilizer | 1.5 |
| Catalyst | 1.5 |
| Polyisocyanate composition obtained | 156.1 |

The mixing time is about 10 seconds and the rate of stirring is 1000 RPM. The resultant mixture is injected into a mold to form a foam.

EXAMPLE 2

The procedures of Example 1 are repeated, except that the thermal decomposition reaction is carried out by use of a part of the condensation product prepared in Example 1 with a decomposition time of 60 minutes, to obtain novel polyisocyanates. The composition of the novel polyisocyanates thus obtained is shown below:

|  | Content (%) |
| --- | --- |
| Binuclear compound (MDI) | 44.8 |
| MIC | 5.4 |
| Trinuclear compound | 22.4 |
| Other higher isocyanates | 27.4 |

The trinuclear compound having an alkoxycarbonyl group is obtained in trace amounts. The isocyanate content therein is 27.4 percent. The polyisocyanate composition is mixed with polyol using of the following composition:

|  | (g) |
| --- | --- |
| Polyol | 100 |
| Blowing agent (A) | 1.0 |
| Blowing agent (B) | 45.1 |
| Foam stabilizer | 1.5 |
| Catalyst | 1.5 |
| Polyisocyanate composition obtained | 152.7 |

A foam is formed in the same manner as in Example 1.

EXAMPLE 3

The procedures of Example 2 are repeated, except that the decomposition time is 2 hours, to obtain a novel polyisocyanate. The composition thereof is shown below:

|  | Content (%) |
| --- | --- |
| Binuclear compound (MDI) | 47.5 |
| MIC | 2.1 |
| Trinuclear compound | 22.6 |
| Other higher isocyanates | 27.8 |

Trinuclear compounds containing an alkoxycarbonyl group are obtained in trace amounts. The isocyanate content therein is 28.8 percent. The polyisocyanate composition is mixed with polyol using of the following composition:

|  | (g) |
| --- | --- |
| Polyol | 100 |
| Blowing agent (A) | 1.0 |
| Blowing agent (B) | 43.8 |
| Foam stabilizer | 1.5 |
| Catalyst | 1.5 |
| Polyisocyanate composition obtained | 145.3 |

A foam is formed in the same manner as in Example 1.

Comparative Example 1

The procedures of Example 2 are repeated, except that the decomposition time is 3 hours, to obtain a novel polyisocyanate. The composition thereof is shown below:

|  | Content (%) |
| --- | --- |
| Binuclear compound | 48.7 |
| Trinuclear compound | 21.9 |
| Other higher isocyanates | 29.4 |

No MIC is detected. No trinuclear compound containing an alkoxycarbonylamino group is detected. An isocyanate content therein is 29.1 percent. The composition thus obtained is mixed with polyol using of the following composition:

|  | (g) |
| --- | --- |
| Polyol | 100 |
| Blowing Agent (A) | 1.0 |
| Blowing Agent (B) | 43.5 |
| Foam stabilizer | 1.5 |
| Catalyst | 1.5 |
| Polyisocyanate composition obtained | 143.7 |

The densities and physical properties of the foams obtained in Examples 1 to 3 and comparative Example 1 are shown in Table 1:

TABLE 1

|  | Example 1 | Example 2 | Example 3 | Comparative Example 1 |
| --- | --- | --- | --- | --- |
| Density (kg/cm$^3$) | 25.2 | 24.9 | 24.6 | 25.3 |
| Physical properties |  |  |  |  |
| compressive strength (kg/cm$^2$) |  |  |  |  |
| ($\parallel$) | 1.82 | 1.80 | 1.79 | 1.61 |
| ($\perp$) | 0.72 | 0.70 | 0.69 | 0.66 |
| Degree of closed-cell (%) | 87.5 | 86.6 | 85.6 | 83.5 |
| Dimensional stability (%) |  |  |  |  |
| (24 hrs. at 110° C.) |  |  |  |  |
| ($\parallel$) | −2.0 | −1.8 | −2.3 | −3.0 |
| ($\perp$) |  |  |  |  |
| (72 hrs. at −30° C.) |  |  |  |  |
| ($\parallel$) | −0.4 | −0.3 | −0.2 | −0.4 |
| ($\perp$) | −0.8 | −1.1 | −1.5 | −8.5 |

Note:
In Table 1, the mark ($\parallel$) shows the case parallel to the direction of expansion, and the mark ($\perp$) shows the case perpendicular to the direction of expansion.

EXAMPLE 4

To a large-size 10 l flask, 2000 g of N-phenyl ethyl carbamate, 144 g of paraformaldehyde, 880 g of BF$_3$(C$_2$H$_5$)O as a catalyst and 6000 cc of benzene as a solvent are charged, and the resultant mixture is subjected to condensation reaction with agitation in a nitrogen stream. The reaction temperature is 80° C. and the reaction time is 5 hours. Thereafter, polycarbamic acid ethyl ester is obtained in the same manner as in Example 1. The composition thereof is shown below:

|  | Content (%) |
|---|---|
| Unreacted N—phenyl carbamate | 3.8 |
| Binuclear compound (MDC) | 57.8 |
| Trinuclear compound | 20.5 |
| Other higher polycarbamates | 17.9 |

To a 6 l flask fitted with a reflux condenser, 200 g of the condensation product thus obtained, 4000 g of diphenyl ether as an inert organic solvent and 10 mg of zinc chloride are charged for thermal decomposition. The procedures of Example 1 are repeated, except that the reaction time is 2 hours 30 minutes, to obtain a polyisocyanate composition. Similarly 4 batches of thermal decomposition reactions are carried out by use of the identical condensation product, and the resultant polyisocyanates are all mixed to be used raw materials for foaming in a nitrogen stream. The composition of the polyisocyanates thus obtained is shown below:

|  | Content (%) |
|---|---|
| Binuclear compound (MDI) | 49.8 |
| Trinuclear compound | 19.8 |
| Other polyvalent isocyanates | 30.4 |

The isocyanate content therein is 30.1 percent.

In the formation process of a foam by mixing the polyisocyanate composition with polyol, foams having varied densities are prepared by varying the amount of the blowing agent (B) in the same manner as in Example 1. The composition for the formation of foams is shown below:

|  | (g) |
|---|---|
| Polyol | 100 |
| Blowing Agent (A) | 2.0 |
| Foam stabilizer | 1.5 |
| Catalyst | 1.5 |
| Polyisocyanate composition obtained | 155.3 |

The varied amount of the blowing agent (B) is 25.7 g, 32.2 g and 38.9 g, respectively.

COMPARATIVE EXAMPLE 2

The procedures of Example 4 are repeated, except that 153.3 g of commercially available polyisocyanate ("MDI-CR-300" of Mitsui Nisso Corporation) having an isocyanate content of 30.5 percent and a viscosity of 180 cp (at 25° C.) is used and the amount of the blowing agent (B) is varied as 25.5 g. 31.9 g and 38.6 g, respectively, to obtain a foam.

The density of the foams obtained in Example 4 and Comparative Example 2 are shown in Table II. The physical properties of the foams thus obtained are shown Table III.

TABLE II

| Content of the Blowing agent (B) in the composition for the formation of foam (%) | 9 | 11 | 13 |
|---|---|---|---|
| Density (kg/m$^3$) Example 4 | 29.7 | 25.9 | 24.6 |
| Comparative Example 2 | 29.2 | 26.1 | 24.4 |

TABLE III

|  | Example 4 | | | Comparative Example 2 | | |
|---|---|---|---|---|---|---|
| Density (kg/m$^3$) | 24.6 | 25.9 | 29.7 | 24.4 | 26.1 | 29.2 |
| physical properties |  |  |  |  |  |  |
| Compressive strength (kg/cm$^2$) | 1.87 | 2.07 | 2.38 | 1.68 | 1.80 | 2.24 |
| Degree of closed-cell (%) | 86.3 | 86.5 | 87.1 | 83.2 | 85.6 | 86.3 |
| Dimensional stability (%) (−30° C., 72 hrs.) *(∥) | −2.2 | −1.1 | −0.5 | −9.5 | −1.7 | −1.3 |

Note:
The mark *(∥) shows a case parallel to the direction of expansion.

The amount of isocyanate used differs from each other, but foams having approximately the same densities are obtained, and no lowering in the foaming efficiency due to a decrease of the isocyanate content is detected.

What is claimed is:

1. A process for the preparation of a polymethylene polyphenyl polyisocyanate composition, which is comprised of polymethylene polyphenyl polyisocyanates, at least a part of the isocyanate groups contained therein being substituted by carbamate groups, or a mixture of polymethylene polyphenyl polyisocyanates having the substituted carbamate groups and polymethylene polyphenyl polyisocyanates not having any carbamate groups, the amount of the carbamate groups in said composition being 0.1 to 10 percent by mole based on the amount of the isocyanate groups in said composition, comprising subjecting a mixture of polymethylene polyphenyl carbamic acid esters having the formula:

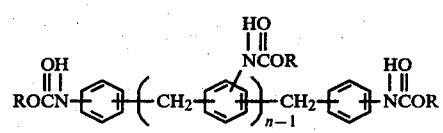

wherein R represents a lower alkyl group having 1 to 4 carbon atoms and n repesents an integer of one or more, to thermal decomposition reaction at 200° to 350° in an organic solvent having a boiling point of up to 300° C. under atmospheric pressure to such an extent that 0.1 to 10 percent by weight of alkoxycarbonylamino group remains unreacted.

2. A process as claimed in claim 1 wherein R is methyl or ethyl.

3. A process as claimed in claim 1 wherein said organic solvent is diphenyl ether.

4. A process as claimed in claim 1 wherein polymethylene polyphenyl carbamic acid ester is used in amount in the range of 1 to 30 percent by weight based on said organic solvent.

5. A process as claimed in claim 1 wherein said catalyst is zinc chloride.

6. A process as claimed in claim 1 wherein said extent is in the range of from 0.5 to 8 percent by weight of alkoxycarbonylamino groups.

* * * * *